United States Patent [19]

Hocker et al.

[11] Patent Number: 4,769,177
[45] Date of Patent: Sep. 6, 1988

[54] ELECTRICALLY CONDUCTIVE AND ANTISTATIC MOULDING COMPOSITIONS

[75] Inventors: Jürgen Hocker, Bergisch-Gladbach; Rolf Dhein, Krefeld; Rudolf Merten, Leverkusen, all of Fed. Rep. of Germany

[73] Assignee: Bayer Aktiengesellschaft, Leverkusen, Fed. Rep. of Germany

[21] Appl. No.: 377,624

[22] Filed: May 13, 1982

Related U.S. Application Data

[63] Continuation of Ser. No. 232,131, Feb. 6, 1981, abandoned.

[30] Foreign Application Priority Data

Feb. 16, 1980 [DE] Fed. Rep. of Germany ....... 3005849

[51] Int. Cl.$^4$ .............................................. H01B 1/00
[52] U.S. Cl. ..................................... 252/500; 524/81; 524/86; 524/99; 524/102; 524/236
[58] Field of Search ...................... 252/511, 500, 518; 524/81, 86, 99, 102, 236, 612

[56] References Cited

U.S. PATENT DOCUMENTS 3,424,698  1/1969  Lupinski et al. ................... 252/500
4,359,411  11/1982 Kim et al. .......................... 252/500

Primary Examiner—Josephine Barr
Attorney, Agent, or Firm—Connolly and Hutz

[57] ABSTRACT

Electrically conductive or antistatic polymers containing charge transfer complexes corresponding to general formula I $$D\,A_n \qquad (I)$$

wherein D represents an electron donor; A represents an electron acceptor; and n represents an integer of from 1 to 5; wherein the charge transfer complexes are in the form of fibre- or needle-like crystals having a diameter-to-length ratio of from 1:20 to 1:500, preferably from 1:20 to 1:200, and a process for the production of these polymers wherein a solution of the donor or a donor salt in a suitable solvent and a solution of the acceptor or an acceptor salt are successively added in this order or in the reverse order to a monomer, a soluble polymer preliminary stage or a polymer solution and the solid charge transfer complexes thus produced in the polymer or its preliminary stage.

3 Claims, No Drawings

ELECTRICALLY CONDUCTIVE AND ANTISTATIC MOULDING COMPOSITIONS

CROSS REFERENCE TO RELATED APPLICATION

This application is a continuation of application Ser. No. 232,131 filed Feb. 6, 1981 and now abandoned.

This invention relates to thermoplastic moulding compositions containing a thermoplastic plastics material and from 0.1 to 30%, by weight, of a charge transfer complex which is substantially insoluble therein in the form of fibre- or needle-like crystals having a diameter-to-length ratio of greater than 1:20.

Although, in the moulding compositions according to the present invention, the characteristic properties of the thermoplastic plastics remain largely unaltered, the compositions show greatly increased electrical conductivity and, as a result, they do not develop electrical charges, i.e. they are antistatic.

Synthetic thermoplastic polymers are generally electrical insulators having specific conductivities of less than $10^{-12} \Omega^{-1} cm^{-1}$. They show a pronounced tendency to develop electrostatic charges which may be unpleasant and, in some cases, even dangerous.

Numerous antistatic additives have been developed with a view to providing thermoplastic plastics with an antistatic finish. These additives are applied, for example, to the surface of plastics articles. However, they lose effectiveness after only a short time. Antistatic additives have also been incorporated into the plastics materials. In this case, the properties of the plastics materials frequently deteriorate or the additives migrate. In most cases, the effect of these additives is to make the surface of the plastics material hydrophilic to a certain extent so that a film of water may form on the surface to prevent charging.

In order to render thermoplastic plastics electrically conductive, attempts have been made to incorporate inorganic, electrically conductive substances, for example metals, metal oxides, metal sulphides, carbon black or graphite. However, such additives show very poor compatibility with the organic polymers. The necessary quantity, generally from 10 to 30%, by weight, based on the plastics material, is so large that the mechanical properties are seriously affected.

Furthermore, soluble charge transfer complexes have also been added to polymers, such as polyacrylonitrile, (cf. German Auslegeschrift No. 15 44 976, French Pat. No. 1,445,213, M. Kryszewski et al., Organic Coatings and Plastics Chemistry, Vol. 38, page 523 (1978) and K. Mizoguchi et al., Nippon Kagaku Kaishi 1977, pages 1029-1034). Since most charge transfer complexes are only sparingly soluble in polymers, this method is generally unsuccessful.

The present invention is based on the discovery that the conductivity of organic polymers may be improved with considerable advantage by adding insoluble charge transfer complexes to them in the form of needle- or fibre-like crystals, the diameter-to-length ratio of the needles or fibres being 1:20 to 1:500, preferably 1:50 to 1:200. Since the fibres or needles are uniformly distributed in the plastics materials, conductivity paths are formed throughout the polymer, imparting greatly increased conductivity to the plastics material as a whole and hence to mouldings produced therefrom.

Charge transfer complexes suitable for the purposes of the present invention may be represented by the following formula:

$$DA_n \qquad (I)$$

wherein
D represents an electron donor;
A represents an electron acceptor; and
n represents an integer of from 1 to 5.

Charge transfer complexes are known. According to the present invention, it is preferred to use those charge transfer complexes wherein the donor component is derived from an organic compound containing nitrogen and/or oxygen and/or sulphur, this donor component generally being present in the form of a cation. Examples of suitable donor components are the cations of the following compounds: triethylamine, diethyl cyclohexylamine, quinoline, benzo-2,3-quinoline, o-phenanthroline, benzthiazole, N-methyl benzimidazole, pyridine, 2,2'-dipyridine, 4,4'-dipyridine, 4,5-dimethyl thiazoline, 1-phenyl imidazolidine, bis-[1,3-diphenyl-imidazolidinylidene-(2)] and bis-[3-methyl-benzthiazolinylidene-(2)], tetrathiafulvalene.

Preferred electron acceptor components are organic polycyano or polynitro compounds, for example tetracyanoethylene, tetracyanoquinodimethane, trinitofluorene, and also naphthalene tetracarboxylic acid dianhydride or iodine. In addition to the donor cations and the acceptor anions, the charge transfer complexes may also contain neutral acceptor molecules. In general up to 4 such molecules are present.

Thermoplastic polymers which may be provided with an antistatic or electrically conductive finish in accordance with the present invention are preferably polyolefins, such as polyethylene, polypropylene, polyvinyl halides, such as polyvinyl chloride, polyacrylates and polymethacrylates, polyesters including the polycarbonates, polyamides and also nonelastomeric polydienes, such as transpolybutadiene. Polyacrylonitrile, polyurethanes and polyvinyl pyridine are also suitable.

The sparingly soluble charge transfer complexes may be added to the thermoplastic plastics in quantities of from 0.1 to 30%, by weight, preferably from 0.3 to 10%, by weight. The charge transfer complex may be added during the actual production of the polymer or may even be subsequently incorporated therein by the mixing techniques normally used for thermoplasts. The needle- or fibre-like crystals of the charge transfer complexes preferably have diameters of from 1 to 10 μm and lengths of from 50 to 200 μm. During the incorporation of these crystals, it is of course important to ensure that the structure thereof is affected as little as possible.

Accordingly, it is particularly advantageous to produce the charge transfer complexes in a solution of the polymer by initially adding the donor component to this polymer solution in the form of an iodide in a suitable solvent and subsequently adding the acceptor, likewise in a suitable solvent. The charge transfer complexes are then directly precipitated in a particularly suitable crystal form.

EXAMPLE 1

To a 20% solution in methylene chloride of a polycarbonate having a molecular weight of 28,000 is added 0.5% based on the polycarbonate used, of a fibre-like charge transfer complex corresponding to formula (II) below:

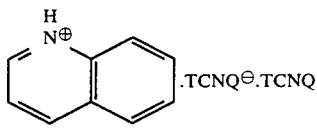

(TCNQ: tetracyanoquinodimethane)

after the solution has been cast to form a film, a yellowish film containing the charge transfer complex (II) in the form of fibres is obtained, its specific conductivity amounting to $3.10^{-6} \Omega^{-1} cm^{-1}$.

EXAMPLE 2

A 5 μm thick polyvinyl chloride film containing 10% of the fibre-like compound (II) shows a specific conductivity of $3.10^{-8} \Omega^{-1} cm^{-1}$.

EXAMPLE 3

A solution of phenanthrolinium iodide and a solution of TCNQ in a molar ratio of 2:3 are successively added to a 20% by wt. solution in methylene chloride of a polycarbonate having a molecular weight of 28,000, so that the sum of these substances amounts to 0.5%, by weight, based on the polycarbonate used. After the films has been cast using a doctor knife, a 6 μm thick film is obtained in which the fibre-like crystals (III) preferentially lie in one direction. The volume conductivity amounts to $3.10^{-5} \Omega^{-1} cm^{-1}$.

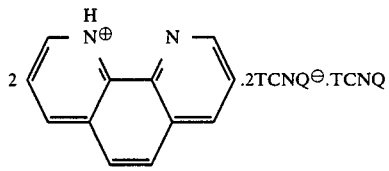

EXAMPLE 4

1% by wt. of the charge transfer complex (IV) is added under nitrogen to a melt of polyamide-6,6 and, after mixing, the melt is rapidly cooled to room temperature.

A 0.5 cm thick plate shows a specific conductivity of $3.10^{-6} \Omega^{-1} cm^{-1}$.

We claim:

1. A composition which comprises a polymer selected from the group consisting of polyethylene, polypropylene, polyvinyl chloride, polyacrylate, polymethacrylate, polycarbonate, and transpolybutadiene having dispersed therein 0.1 to 30% by weight of a charge transfer complex of the formula $$DA_n$$

wherein D is an electron donor, selected from the group consisting of cations of triethylamine, diethyl cyclohexylamine, quinoline, benzo-2,3-quinoline, o-phenanthroline, benzthiazole, N-methyl benzimidazole, pyridine, 2,2'-dipyridine, 4,4'-dipyridine, 4,5-dimethyl thiazole, 1-phenyl imidazolidine, bis-[1,3-diphenyl-imidazolidinylidene-(2)], bis-[3-methyl-benzthiazolinylidene-(2)] and tetrathiafulvalene, A is an electron acceptor selected from the group consisting of anions of tetracyanoethylene, tetracyanoquinodimethane, trinitofluorene, naphthalene tetracarboxylic acid dianhydride and iodine and n is an integer from 1 to 5, said charge transfer complex being in the form of a fiber-like crystal or a needle-like crystal and having a diameter-to-length ratio of from 1:20 to 1:500.

2. The composition of claim 1 wherein the diameter-to-length ratio of said charge transfer complex is from 1:20 to 1:200.

3. The composition of claim 1 wherein said charge transfer complex is present in an amount of from 0.3 to 10% by weight.

* * * * *